(12) United States Patent
Cressman et al.

(10) Patent No.: US 6,193,622 B1
(45) Date of Patent: Feb. 27, 2001

(54) AUTOMATIC CHAIN TENSIONER

(75) Inventors: Brian Mark Cressman; Kevin Donald Buschert, both of New Hamburg (CA)

(73) Assignee: Ontario Drive & Gear Limited, New Hamburg (CA)

( * ) Notice: Subject to any disclaimer, the term of this patent is extended or adjusted under 35 U.S.C. 154(b) by 0 days.

(21) Appl. No.: 09/348,996

(22) Filed: Sep. 1, 1998

(30) Foreign Application Priority Data

Sep. 19, 1907 (GB) .................................................... 9718408

(51) Int. Cl.⁷ ................................. F16N 7/08; F16N 7/22
(52) U.S. Cl. .................... 474/109; 474/101; 474/117; 474/111
(58) Field of Search ........................... 474/109–113, 117, 474/133–135, 159, 101, 140; 280/216, 253, 218, 252

(56) References Cited

U.S. PATENT DOCUMENTS

| | | | |
|---|---|---|---|
| 1,777,527 | * 10/1930 | Morse | 474/111 |
| 3,802,286 | 4/1974 | Winklhofer et al. | |
| 4,395,250 | * 7/1983 | King | 474/111 |
| 4,925,199 | * 5/1990 | Hirmann | 280/216 |
| 5,730,674 | * 3/1998 | Ott | 474/111 |

FOREIGN PATENT DOCUMENTS

| | | | |
|---|---|---|---|
| 1 775 273 | 5/1971 | (DE) . | |
| 0 113 685 | 7/1984 | (EP) | F16H/7/08 |
| 1 290 279 | 9/1972 | (GB) | F16H/7/08 |

* cited by examiner

Primary Examiner—David A. Bucci
Assistant Examiner—Marcus Charles
(74) Attorney, Agent, or Firm—Anthony Asquith & Co.

(57) ABSTRACT

The drive-chain tensioner is automatically self-adjusting. A chain-slipper is guided to follow wear-movement of the chain. A cam is mounted on the follower. If slack in the chain increases, the cam is rotated by a cam spring to a position in which a larger radius of the cam lies under the follower. The cam provides a solid abutment that prevents the chain from compressing the tensioning springs and becoming slack when drive is reversed. For compactness and good load distribution, the chain is supported on a saddle between two cams. The cams have ratchet teeth.

27 Claims, 5 Drawing Sheets

AUTOMATIC CHAIN TENSIONER

This invention relates to chain tensioners, of the kind used for taking up slack, due to wear, in a transmission-drive chain or belt.

BACKGROUND TO THE INVENTION

In a typical case such as a transmission drive chain, the degree of tension or slack in the chain is adjustable by a person un-clamping a slipper member, moving the slipper member to a new location where the chain is tighter, and then re-clamping the slipper member. This adjustment is not automatic, in that the chain gets progressively slacker until the person effects the adjustment.

In other known types of tensioner, a spring presses the slipper against the chain, whereby tension is maintained in the chain as the chain wears, due to the resilience of the spring.

In a case where the chain acts uni-directionally, i.e only in forward-drive, a spring-biassed slipper pressed against the slack-run of the chain can be adequate. But in the case where the chain acts sometimes in forward-drive, and sometimes in reverse-drive, a spring-biassed slipper pressed against the slack run of the chain is not enough, because the slack-run becomes the tight-run in reverse.

Providing two slippers, one to each run, and spring-biassing them together by means of a floating spring clamp, can serve in those cases. However, in that case it is hard to achieve the right compromise of spring forces over the required range of movement: particularly since sudden reversals of load can hurl the tensioner suddenly from side to side.

DETAILED DESCRIPTION OF PREFERRED EMBODIMENTS

By way of further explanation of the invention, exemplary embodiments of the invention will now be described with reference to the accompanying drawings, in which.

The apparatuses shown in the accompanying drawings and described below are examples which embody the invention. It should be noted that the scope of the invention is defined by the accompanying claims, and not necessarily by specific features of exemplary embodiments.

Figure 1:
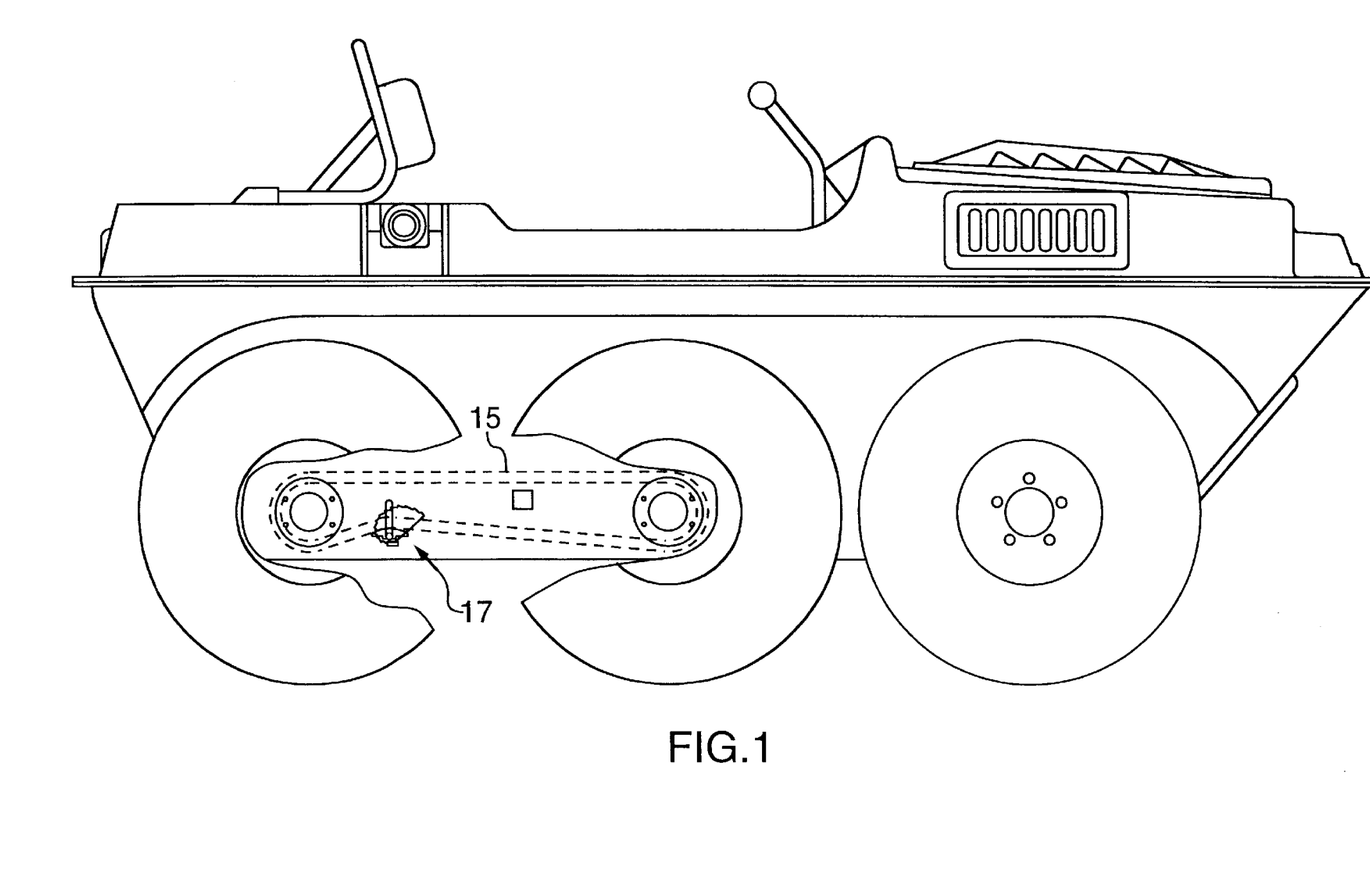
FIG. 1 is a side-elevational, partly-sectioned, view of a three-axled ATV (all-terrain vehicle), showing the transmission drive chains.
Figure 2:
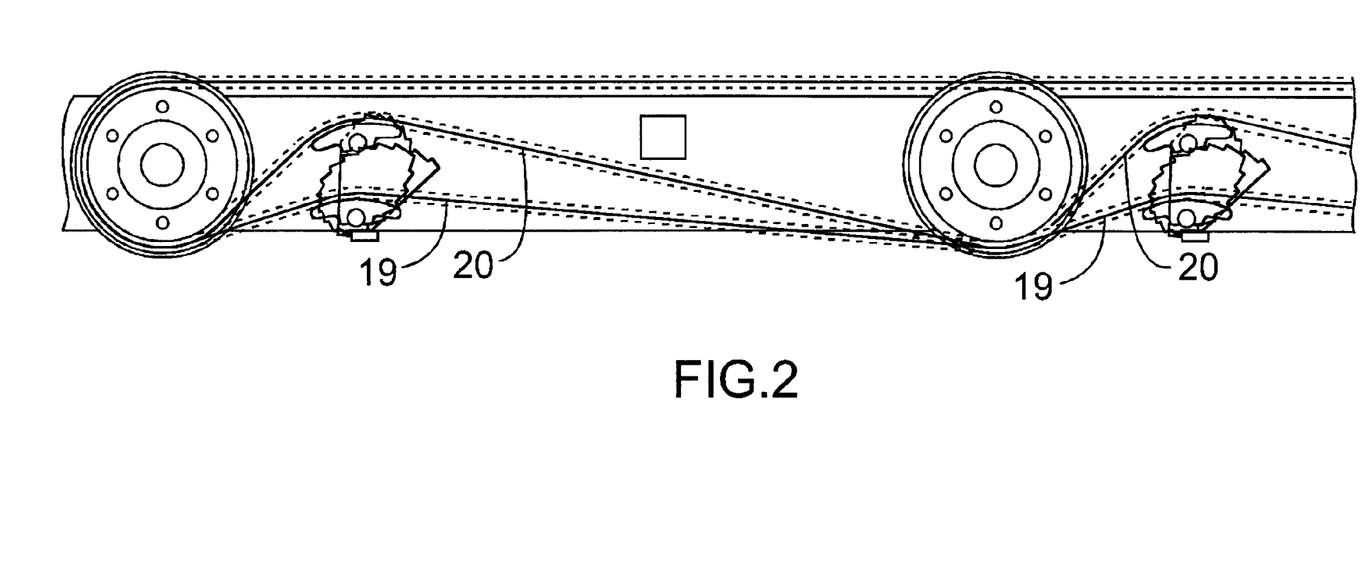
FIG. 2 is a corresponding side elevation of the drive chains, in which a chain tensioner embodying the new invention is included.

In FIG. 1, one of the main drive roller chains 15 is kept in tension by an automatic tensioner 17. FIG. 2 shows the range of movement which the tensioner has to accommodate between the line 19 of a chain in the new-configuration and the line 20 of the worn-configuration, is shown in FIG. 2. The range corresponds to (a little over) the length of one link of the chain. Thus, if the chain becomes slacker than the line 20 of worn-configuration, the remedy is to take one link out of the chain.

Figure 3A:
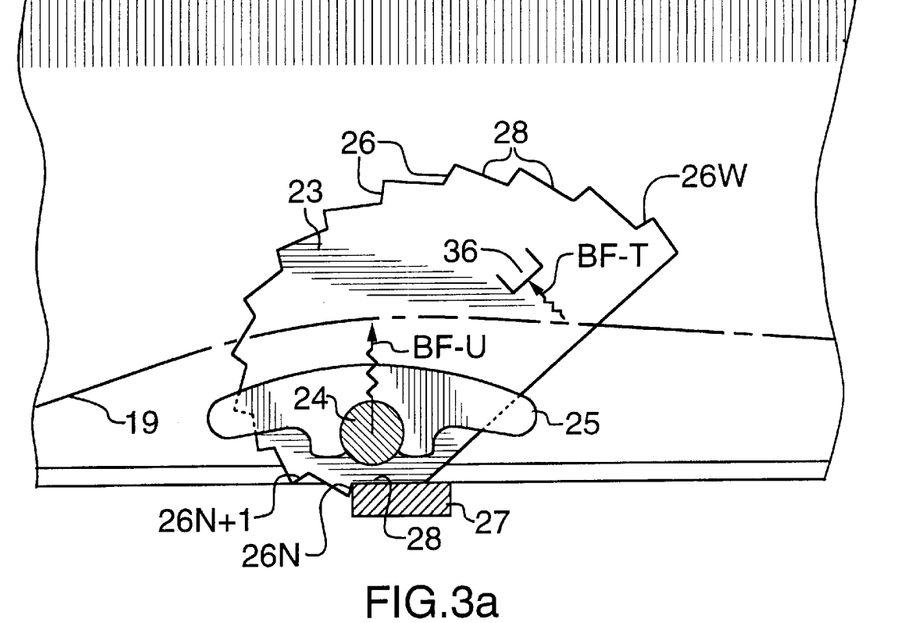
FIG. 3a is a close-up of the chain tensioner shown in FIG. 2, showing the tensioner in a new-configuration.
Figure 3B:
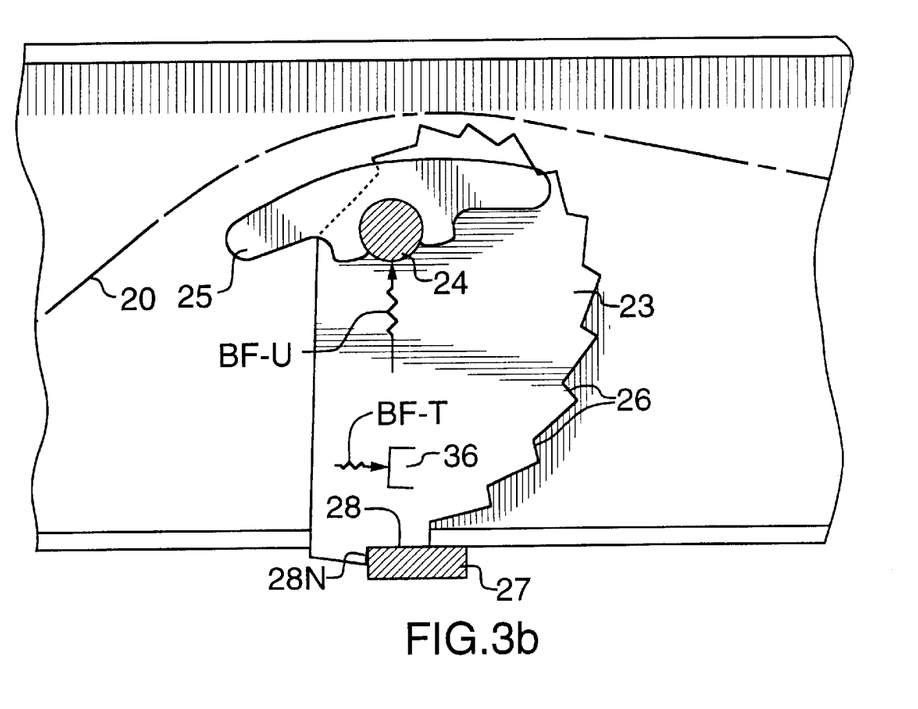
FIG. 3b is the same view as FIG. 3a, but shows the tensioner in a worn-configuration.

FIG. 3a shows the condition of the tensioner in the new configuration, and FIG. 3b shows the condition of the tensioner in the worn configuration.

The tensioner includes a ratchet-cam 23. A cam-shaft 24 carries a slipper 25 (made of nylon), against which the chain directly engages.

The ratchet-cam 23 is provided with means for exerting biassing forces thereon, being a biassing-force BF-T, which exerts a rotational torque on the ratchet-cam, and a biassing-force BF-U, which exerts an upward force on the cam.

As the chain wears, the configuration line of the chain moves from the new line 19 to the worn line 20. The ratchet-cam 23 has teeth 26, which engage a cross-bar 27. As the chain slack increases, the cam 23 is allowed to move progressively upwards, under the action of the biassing force BF-U, which thereby maintains-tension in the chain.

As this upward movement of the ratchet-cam continues, the tooth 26N, being the tooth which is in engagement with the cross-bar in FIG. 3a, breaks contact with the cross-bar. Now, the biassing force BF-T causes the ratchet-cam 23 to rotate anti-clockwise, and the ratchet-cam rotates until the next tooth 26N+1 engages the cross-bar 27. After that, the engagement of the tooth 26N+1 with the cross-bar prevents the biassing-force BF-T from rotating the cam further, until increasing slack in the chain again causes the cam to click over to the next tooth.

When the chain is driving forwards normally, the tensioner is in the slack-run of the chain. In that case, the force between the chain 15 and the nylon slipper 25 is minimal. But when the chain is driving in reverse, the tension in the chain can become very high; therefore, the contact force between chain and slipper is correspondingly high, especially (because of the geometry of the layout) as the chain becomes worm. This high contact force between the chain and the slipper is reacted by the engagement of the flat 28 of the tooth against the top surface of the crossbar 27.

The designer should see to it that the geometry of the teeth, the cam-shaft 24, and the cross-bar 27 are such that the ratchet-cam does not tend to slip back, once a tooth has clicked over the cross-bar.

The magnitudes of the biassing forces is important. On the one hand, adequate tension must be maintained in the chain to stop the slack-run of the chain from slapping. On the other hand, if the biassing force BF-U were too large, the chains might wear at too rapid a rate. Plus, and perhaps more importantly, too large a BF-U force would exaggerate the gap between the flat 28 and the cross-bar 27, whereby, upon a sudden imposition of heavy tension in what was the slack run of the chain, due to drive-reversal, the flat 28 would be smacked against the cross-bar 27 with a noticeable knock. When the biassing-force BF-U is light, this gap is not forced to its maximum. A biassing force BF-U in the region of 5 or 10 lbsf has been found satisfactory, given a total travel of a little over 2 inches, in 12 ratchet steps.

Of course, ATV's are subjected to abusive motions, whereby the tendency for the chains to bounce and slap is quite marked. A particularly heavy bounce of the chain might cause a tooth of the ratchet-cam to click over prematurely. If that happens, the extra tension would dissipate gradually as more wear occurs, and knock is all the less likely to occur as the flat 28 is pressed tightly against the cross-bar.

Figure 4:
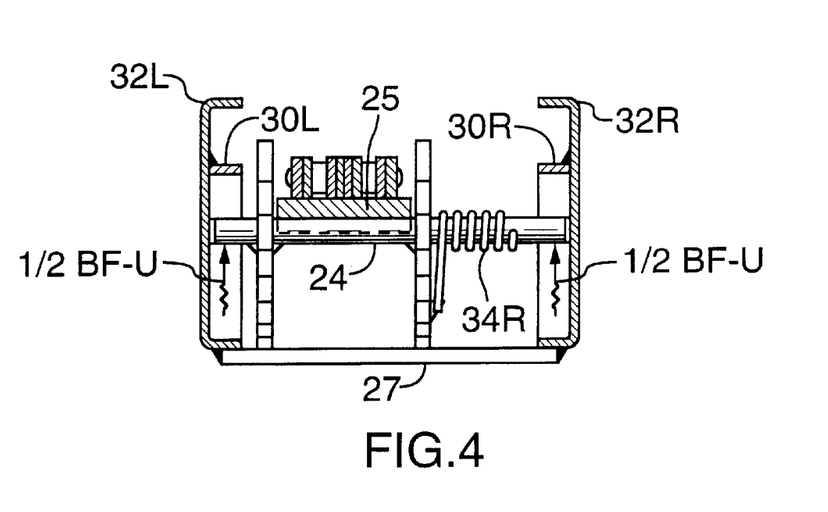
FIG. 4 is a front elevation of the chain tensioner of FIG. 2.

As shown in FIG. 4, two ratchet cams 23 are welded to the cam-shaft 24, and the nylon slipper 25 lies between the two cams. The cam-shaft is located between left and right guide channels 30L,30R, which are welded to the left and right chassis members 32L,32R. The cam-shaft floats vertically within the guide-channels, under the action of biassing springs.

Figure 5:
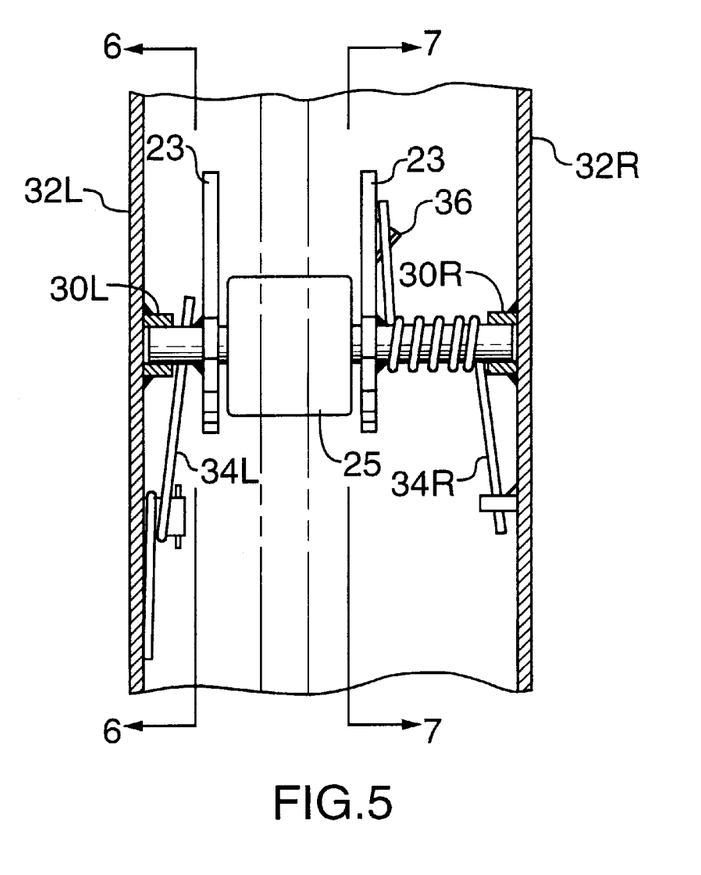
FIG. 5 is a plan view of the tensioner of FIG. 2.
Figure 6:
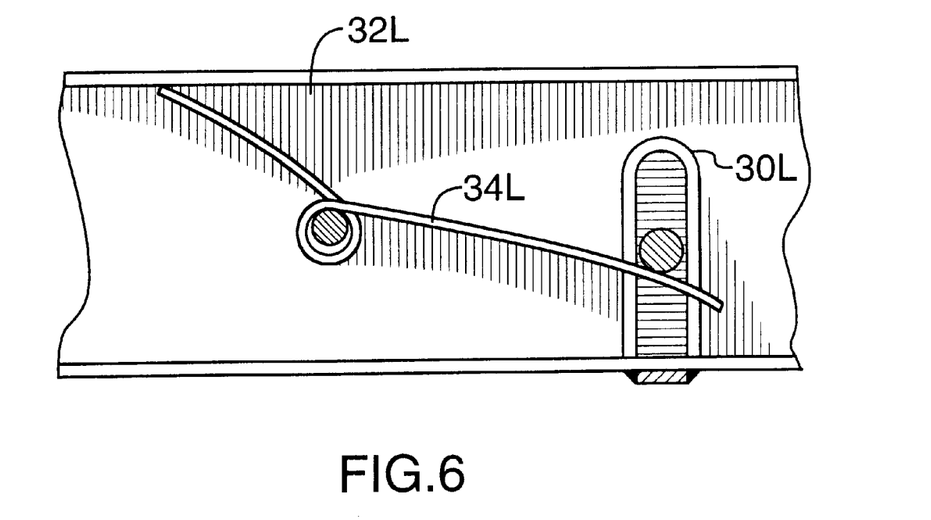
FIGS. 6 and 7 are views on arrows 6—6 and 7—7 of FIG. 5.
Figure 7:
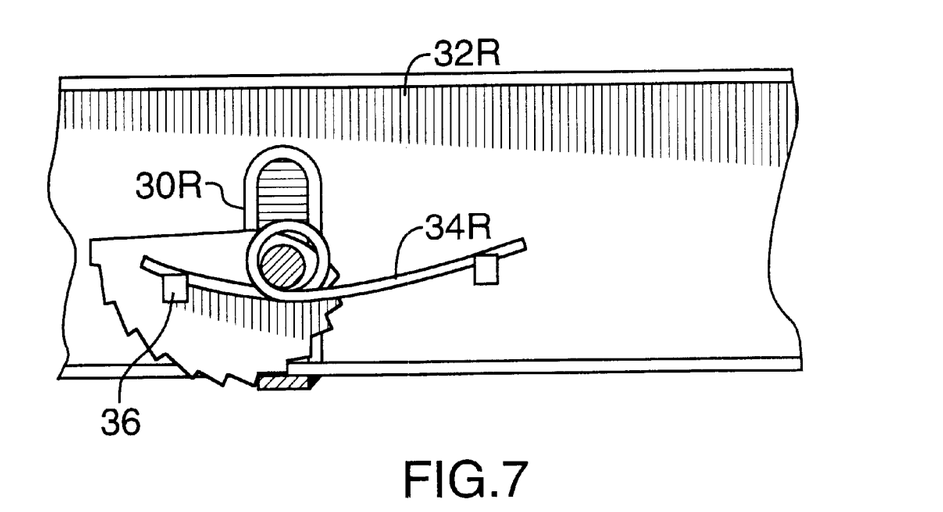

The upwards force BF-U (shown diagrammatically in FIG. 4) on the cam-shaft is derived from left and right springs 34L,34R. Both springs are shown structurally in FIG. 5, and the left spring 34L is shown in FIG. 6 and the right spring 34R is shown in FIG. 7. The total upwards biassing force BF-U is provided by the sum of the upwards forces due to the two springs 34L,34R.

The biassing torque comes only from the right spring 34R. This spring, as shown in FIG. 7, presses upwards on the cam-shaft by virtue of its central coils being wrapped around the cam-shaft. The torsional bias arises from the engagement between one end of the spring 34R and the tag 36 on the ratchet-cam.

The springs are so arranged that the springs press the cam-shaft 24 against the sides of the guide channels 30L, 30R to only a minimum extent over the whole range of travel of the cam-shaft.

Both springs of course require enough stressed wire within the spring to provide adequate biassing force over the whole travel range. The left spring 34L, which is responsible only for half the upwards bias BF-U needs only a few coils, as shown, whereas the right spring, which is responsible not only for half BF-U, but also for all of BF-T, requires many more coils. (If the springs lie nearer the other of the chassis members, the springs would be reversed.)

In some embodiments of the invention, the ratchet teeth 26 on the cam 24 may be so formed as to provide the same depth of step between the first and second teeth as between the eleventh and twelfth teeth. The length of the flats 28 between the teeth varies, as shown, in order that the angular increment required to click a tooth is the same throughout the range of angular movement of the cam.

A nylon slipper 25 has been shown for rubbing against the chain. A passively-rotating idler-sprocket could alternatively be provided. The advantages as described arise from the design of the tensioning device, as described, rather than what is tensioned, whereby the term chain or drive chain as used herein should be construed as also including drive belts.

The apparatus as described herein may be compared with chain tensioners that operate on a single-direction basis.

Single-direction tensioners operate in a comparatively more benign environment, in that a single-direction tensioner is never subject to reverse loading. The slack run of the chain remains the slack run at all times, and the heavy forces arising in the tight run are never experienced by the single-direction tensioner. By contrast, a both-direction tensioner has to cope, upon drive-reversal, with the effects of the full tension of the chain. Furthermore, the both-direction tensioner has to cope with shock loading. Also, reversal of direction can be quite violently abusive, particularly in a case such as an ATV, as described herein.

On the other hand, the main purpose of most single-direction tensioners, for example of the type as commonly found in association with the timing chain of an automotive engine, is to provide a constant tension in the chain. The speed of the chain might vary during operation from zero to high linear speeds, but the speed is never reversed. Demanding as this requirement can be, the requirement for supporting heavy loads in the tensioner, and particularly for supporting heavy shock loads, does not arise.

In a single-direction tensioner, the idea is to maintain a steady spring force against the chain. If the tensioner is to include an automatic adjuster, the designer often is concerned to provide enough built-in resilience in the tensioner that the chain does not "bottom", which might cause a sudden increase in chain tension, and consequent shortening of service life. On the other hand, in a both-direction tensioner, the chain inevitably always bottoms against the tensioner, when reversed.

In a both-direction tensioner, the abutment against which the chain bottoms in reverse cannot be allowed to be resilient. Indeed, the maintenance of chain tension in the apparatus as described, by means of spring resilience, only happens in the forwards direction. In reverse, what has now become the slack tun of the chain is (in most cases) not tensioned.

While single-direction tensioners (including e.g those for timing chains in auto engines) have a tradition of automatic self-adjustment for maintaining chain tension and for curbing the higher amplitudes of vibration of the slack run of the chain, both-direction tensioners have no such tradition. Conventionally, to compensate for chain wear, the tradition has been that both-direction tensioners have been manually adjustable.

The difference in manner of operation between single-direction and both-direction tensioners leads to a number of differences that must be borne in mind by the designer. First, and major, is the requirement that the apparatus has to cope with abusive shock loading, and with reversals of load. On the other hand, at least on ATVs, the really violent abuse occurs when the chain is basically not moving (e.g when the driver is trying to extricate a stuck vehicle); so the designer of the chain drive needs to emphasise good pure-tension properties, as well as good wear properties.

In a single-direction tensioner, often the designer is concerned to balance the force of an adjusting spring with the force of the chain tensioning spring, the two springs being arranged in series. In a both-direction tensioner, the chain-tensioning spring cannot be allowed to be in series with the adjustment spring (and indeed, in reverse, there is no chain-tensioning spring).

Because the adjustment spring and the chain-tensioning spring are not in series, the two springs can each be designed without having to be compromised by the need. to accommodate to the other's requirements. In the apparatus as described herein, the chain-tensioning spring does not bias the cam, either to promote or inhibit adjustment; and the cam-adjuster (torsion) spring does not affect the force with which the slipper or follower presses against the chain. In fact, the cam spring provides a torque on the cam, which is reacted against the cross-bar by the edge-of-tooth of the currently-engaged ratchet tooth; the adjuster spring is isolated from affecting the chain tension because the edge-of-tooth surface lies more or less parallel with the load line that supports the tension in the chain.

Similarly, the chain tension is isolated from affecting the adjuster, because the flat-of-tooth surface of the currently-engaged ratchet tooth engages the flat of the cross bar, and sits more or less flat-on, i.e at right angles, to the load line. The two functions—chain tension support in reverse, and adjustment—are quite separated, in the apparatus as depicted herein.

Space being tight around the transmission chain of an ATV, It is important to fit the tensioner apparatus into a small space envelope. One of the more constrained dimensions of the envelope is the dimension in the (vertical) plane in which the adjuster travels to take up the slack in the chain. The apparatus as described herein has a large adjustment travel distances, but the envelope in this plane is kept to hardly any more than the chain requires anyway as it becomes progressively slacker due to wear.

This efficient use of the available envelope has been achieved by placing the two ratchet cams one either side of the chain. The chain slipper is supported by the cam shaft or spindle, which straddles across (rigidly) between the two cams.

To ensure that the load from the chain is divided between the two cams, the cam spindle is free to float in the tilting or tipping sense (i.e in the roll-sense with respect to the ATV itself). The load from the chain lies between the two cams, and, because it can rock or tip, the cam spindle does rock, until both cams touch firmly against the cross-bar.

Not constraining the cam assembly against rocking is useful not only for equalising the load between the two cams, but also from the manufacturing standpoint. It would be quite difficult to mount the assembly of the two cams (the assembly being rigid in itself) rigidly to the frame (i.e rigid in the sense of constraining the assembly against tipping) while permitting the required up/down movement.

In the designs as shown, the cam spindle is well-constrained against rocking or tilting of the cam assembly in the yaw sense. However, it does not matter so much that the cam spindle cannot tilt in the yaw sense. The yaw constraint might result in only one of the cams having its edge-of tooth surface touching the cross-bar, but that does not matter when compared with lack of constraint in the roll-sense, which means that both flat-of-tooth surfaces can share and divide their loads onto the cross-bar.

Placing the cams to the sides of the chain can be expected to result, as shown, in a long-travel adjuster in a compact space envelope. But, again as shown, this placement has not involved any compromise in the strength of the ratchet teeth and other components. As can be seen, the components are chunky and sturdy—as of course they need to be in a both-direction tensioner. The two cams, which carry the slipper between them, provide a good solid platform for supporting the chain loads.

Another aspect the designer should consider is this. The heavy forces arising from the chain in reverse need to pass through abutting surfaces. The designer should prefer that the abutting surfaces should be simply at right angles to the direction of the heavy forces, and in the apparatus as depicted herein, this is the case. However, it might occur to a designer to try to secure the movement needed to procure automatic adjustment by aligning the ratchet teeth at an angle; some designs of automatic adjuster have been based on turning a screw thread, to take up slack, by the use of angled ratchet teeth. However, in such a design, when the teeth are under load, the fact that the teeth lie at an angle means that the designer must provide some means whereby the ratchet teeth can be prevented from rotating. That is to say, an angled-tooth design involves applying a force to the ratchet teeth (when adjustment is required), and then applying another heavy force to stop the ratchet from moving (when adjustment is not required). Such designs start to resemble intricate clockwork, which, apart from being fragile, is not appropriate on an ATV. In the apparatus as described herein, the heavy forces from the chain in reverse are reacted by components engaging and abutting flat-on. During reversal, the flat-of-tooth surface smacks against the flat of the cross-bar, both abutting surfaces being at right angles to the direction of the heavy force.

As far as over-adjustment is concerned, the following points can be mentioned. In any chain tensioner, if the chain is over-stretched in forward drive, the resulting extra slack in the slack run of the chain might be taken up by the adjuster as if it were wear. Such over-adjustment is detrimental, because the chain remains in induced tension, which causes further wear to take place more rapidly, at least until the extra tension has been dissipated.

However, when the adjuster is based on a ratchet, there are only a few specific times, in the life of the adjuster, where over-adjustment is likely to occur. Thus, when a tooth has just clicked over, it would take a very large over-stretch, just then, to make the adjuster click over again. With a ratchet adjuster, in most of the conditions of wear of the chain, a mildly abusive over-stretching of the chain will not cause the ratchet to click over. Only when the ratchet is near to clicking anyway will over-stretching cause click-over, and over-adjustment.

This may be contrasted with an adjuster of the type that takes up slack continuously, i.e steplessly. In that case, whenever over-stretching of the chain occurs, i.e at any time, it will cause over-adjustment. With a stepless adjuster, over-stretching always leads to over-adjustment, whereas, with a ratchet adjuster, the likelihood of over-adjustment due to over-stretching the chain waxes and wanes depending on the disposition of the ratchet teeth.

The fewer the number of teeth, the fewer the periods when over-stretching of the chain might cause over-adjustment. Providing a ratchet with a travel made up of, say, ten or twelve teeth, gives a good compromise between good slack take-up while avoiding over-adjustment.

Providing just a small number of ratchet teeth also means that each flat-of-tooth surface can be large, which is important because the forces are heavy and abusive. And as mentioned, with a stepped ratchet, the flat-of-tooth surface can be made tangential to the cam-spindle, whereby the force on the flat-of-tooth surface, even though large, imposes no tendency for the surface to be displaced laterally.

The total lift of the cam comes from the aggregate of the lifts of the steps between the teeth. In a stepless cam, the lift would come from the fact that points on the cam abutment surface lie at an angle to the tangential. A stepped ratchet can have a high lift, in aggregate, even though the abutment surface of each tooth is tangential; but a stepless cam cannot have a high lift, since that would mean the abutment surface would be at a large angle to the tangential, which might be enough to give rise to spurious side loads at the abutment.

The total adjustment travel capability of the apparatus should be in line with other servicing requirements. On an ATV, the total lift preferably should be equal to one, or two, links of the chain; i.e the designer should provide that when the adjuster runs out of travel, the remedy is to take one or two links out of the chain.

What is claimed is:

1. An automatically self-adjusting drive tensioner apparatus, in combination, with a tensile drive-means wherein:

the tensile drive-means undergoes occasional drive-direction reversal, of a drive-direction in that a first run of the drive-means, the drive-run, is under drive-tension, and an other run of the drive-means; termed the return-run, is under return-tension, and when the drive-direction is reversed, the second run becomes the drive-run, the first run hereby becoming the return-run;

the apparatus includes a follower, which is arranged for direct contact with a tensile-drive-component of the tensile-drive means;

the tensile-drive means includes a frame component;

the apparatus includes an adjustable-length strut-assembly;

the configuration of the apparatus is such that, during the drive-direction reversal, a component of the tension force in the tensile-drive-component is transmitted to the follower, and is transmitted therefrom to the frame component, in a load-line which includes the strut-assembly;

the apparatus includes a follower-guide-means, for guiding the follower for. movement in a direction to take up slack in the tensile-drive-component due to wear thereof;

the strut-assembly engages the follower at a strut/follower point, and engages the frame component at a strut/frame point, and lies in position between the two points;

the strut-assembly includes an operable adjuster-means, which is effective, when operated, to elongate the strut-adjuster, responsive to a net force on the strut-assembly, between the two points, being in a direction to urge the points apart;

the strut-assembly is so structured that the strut-assembly becomes solid, in that the points are held apart by the strut-assembly in a fixed-distance relationship, responsive to the net force on the strut-assembly, between the two points, being in the direction to urge the points together.

2. As in claim 1, wherein:

the strut-assembly includes left and right struts;

the left and right struts are positioned respectively to left and right of the tensile-drive-component;

the left strut engages the frame component at a left strut/frame point and the follower at a left strut/follower point, and the right strut engages the frame component at a right strut/frame point and the follower at a right strut/follower point;

the strut-assembly includes a straddle-means, being a structure for joining and connecting the left and right struts;

and the straddle-means includes means for supporting and holding the follower.

3. As in claim 2, wherein the straddle-means comprises a means for joining the left and right struts together in a rigidly-fixed-together relationship during operation, whereby the left and right struts and the straddle means comprise a rigid left-and-right-strut assembly.

4. As in claim 2, wherein the operable adjuster-means, for elongating the strut assembly, is operable upon both struts in unison.

5. As in claim 2, wherein the follower-guide-means for the rigid left-and-right-strut assembly is so arranged as to permit the assembly to tip or tilt, to the extent that the rigid left-and-right-strut assembly can, upon tipping, adopt an alignment configuration in which the left and right struts both make forceful contact with the frame component, respectively at the left and right strut/frame points;

whereby the load transmitted from the follower to the frame component, during reversal, is divided proportionately between the left and right struts.

6. As in claim 1, wherein:

the strut assembly includes a cam, which is mounted for rotation with respect to the frame component about a cam-spindle-member;

the cam has an outer-edge, and the outer-edge is configured with a gradually increasing radius with respect to the cam-rotation-spindle;

the frame component includes a cam-abutment-member, which is arranged for contact with the outer-edge of the cam, and which is so arranged in the apparatus that, when the cam rotates, the outer-edge of the cam moves tangentially relative to the cam-abutment-member;

the strut/follower point is located in one of the cam-spindle-member and the cam-abutment-member, and the strut/frame point is located in the other member, whereby a line joining the two points is a radius of the cam;

the adjuster means for elongating the strut includes a cam-spring-means, for rotationally-biassing the cam to rotate about the spindle, in the directional sense whereby the radius of the cam that lies between the two points is urged by the cam-spring-means to increase;

the arrangement of the adjuster means is such that, when some slack appears in the tensile-drive-component, the adjuster means operates, in that as the gap between the points increases, the cam rotates, under the urging of the cam-spring-means, to a position at which the increasing radius of the cam fills the gap between the points.

7. As in claim 6, wherein:

the outer-edge of the cam has ratchet teeth;

the cam-abutment-member comprises a complementary ratchet-bar;

the ratchet teeth are arranged to click over the ratchet-bar, the arrangement thereof being such that the ratchet teeth prevent the cam from rotating, during operation, in a directional sense whereby the radius of the cam between the two points would become shorter.

8. As in claim 7, wherein:

each tooth of the ratchet includes a surface termed the flat-of-tooth surface, and a surface termed the edge-of tooth surface;

the ratchet-bar includes a surface, termed the flat-of-ratchet-bar surface, which engages the flat-of-tooth surface of one of the ratchet teeth;

the cam-abutment member includes a surface, termed the edge-of-ratchet-bar surface, which engages the edge-of-tooth surface of one of the ratchet teeth, termed the currently-engaged tooth;

the engagement of the flat-of-tooth surface of the currently-engaged tooth with the flat-of-ratchet-bar surface, is in the load-line between the follower and the ratchet-bar.

9. As in claim 8, wherein, in respect of each tooth, the flat-of-tooth surface lies substantially tangentially with respect to the cam-spindle-member.

10. As in claim 9, wherein, in respect of each tooth, the edge-of-tooth surface lies substantially radially with respect to the cam-spindle-member.

11. As in claim 10, wherein the cam-spring-means acts on the cam in the direction to urge the edge-of-tooth surface of the currently-engaged tooth into contact with the edge-of-ratchet-bar surface of the ratchet-bar.

12. As in claim 11, wherein the edge-of-tooth surface has a lift length of about 40% of the length of the face-of-tooth surface.

13. As in claim 7, wherein:

the cam includes a left cam and a right cam;

the left and right cams are positioned respectively to left and right of the tensile-drive-component;

the left cam engages the frame component at a left cam/frame point and engages the follower at a left cam/follower point, and the right cam engages the frame component at a right cam/frame point and engages the follower at a right cam/follower point;

the strut-assembly includes a straddle-means, being a structure for joining and connecting the left and right cams;

the straddle-means includes means for supporting and holding the follower;

the straddle-means comprises a means for joining the left and right cams together in a rigidly-fixed-together relationship during operation, whereby the left and right cams and the straddle means comprise a rigid left-and-right-cams assembly;

and the operable adjuster-means, for elongating the strut assembly, is operable upon both struts in unison.

14. As in claim 13, wherein:

the follower-guide-means for the rigid left-and-right-am assembly is so arranged as to permit the assembly to tip or tilt, to the extent that the rigid left-and-right-cam assembly can, upon tipping, adopt an alignment configuration in which the left and right cams both make forceful contact with the frame component, respectively at the left and right cam/frame points;

whereby the load transmitted from the follower to the frame component, during reversal, is divided proportionately between the left and right cams.

15. As in claim 14, wherein the left and right cams share a common cam spindle-member, to which both are rigidly attached, and the common cam spindle-member comprises the straddle-means.

16. As in claim 15, wherein:

the apparatus includes a tensioning-spring means, for urging the follower against the chain;

the tensioning-spring means includes left and right tensioning-springs, located one to each end of the cam spindle-member;

the cam-spring-means includes a torsion spring, and the apparatus includes means for reacting the torsion spring against the frame component;

the torsion spring has coils, and the coils lie wrapped round the cam-spindle-member.

17. As in claim 16, wherein the arrangement of the apparatus is such that the cam-spring-means is configured also as one of the left and right tensioning-spring means.

18. As in claim 17, wherein the follower-guide-means comprises a means for guiding the ends of the cam-spindle member, which includes left and right guideways provided in the frame component.

19. As in claim 13, wherein the ratchet-bar is in the form of a cross-bar, which spans between adjacent frame members.

20. As in claim 19, wherein:

the tensile- drive-means includes two tensile-drive-components, side-by side on the same axle;

the frame members are wide enough apart to permit both tensile-drive-components to lie between the frame members.

21. As in claim 20, wherein the apparatus is reversible in the left/right sense.

22. As in claim 1, wherein the tensile-drve-component is a chain.

23. As in claim 22, wherein:

the tensile-drive-means is included in the drive-transmission of a vehicle, and the first run is the drive-run when the vehicle is undergoing normal forwards drive;

and the apparatus is located on the second run, being the slack run when the vehicle is undergoing normal forwards drive.

24. As in claim 1, wherein the apparatus includes a tensioning-spring which is arranged for biassing the follower in a biassing-direction, being a direction to apply tension to the tensile-drive component.

25. As in claim 1, wherein the frame component is stationary, and fixed relative to the tensile-drive-component.

26. As in claim 7, wherein the tensile-drive-component is a chain, and the aggregate lift of the ratchet teeth is equivalent to two links thereof.

27. As in claim 1, wherein the tensile-drive-component is a chain, and the ratchet teeth are so pitched as to provide between 5 and 10 ratchet clicks per link of the chain.

* * * * *